April 21, 1970     R. W. MacCARTHY     3,507,040

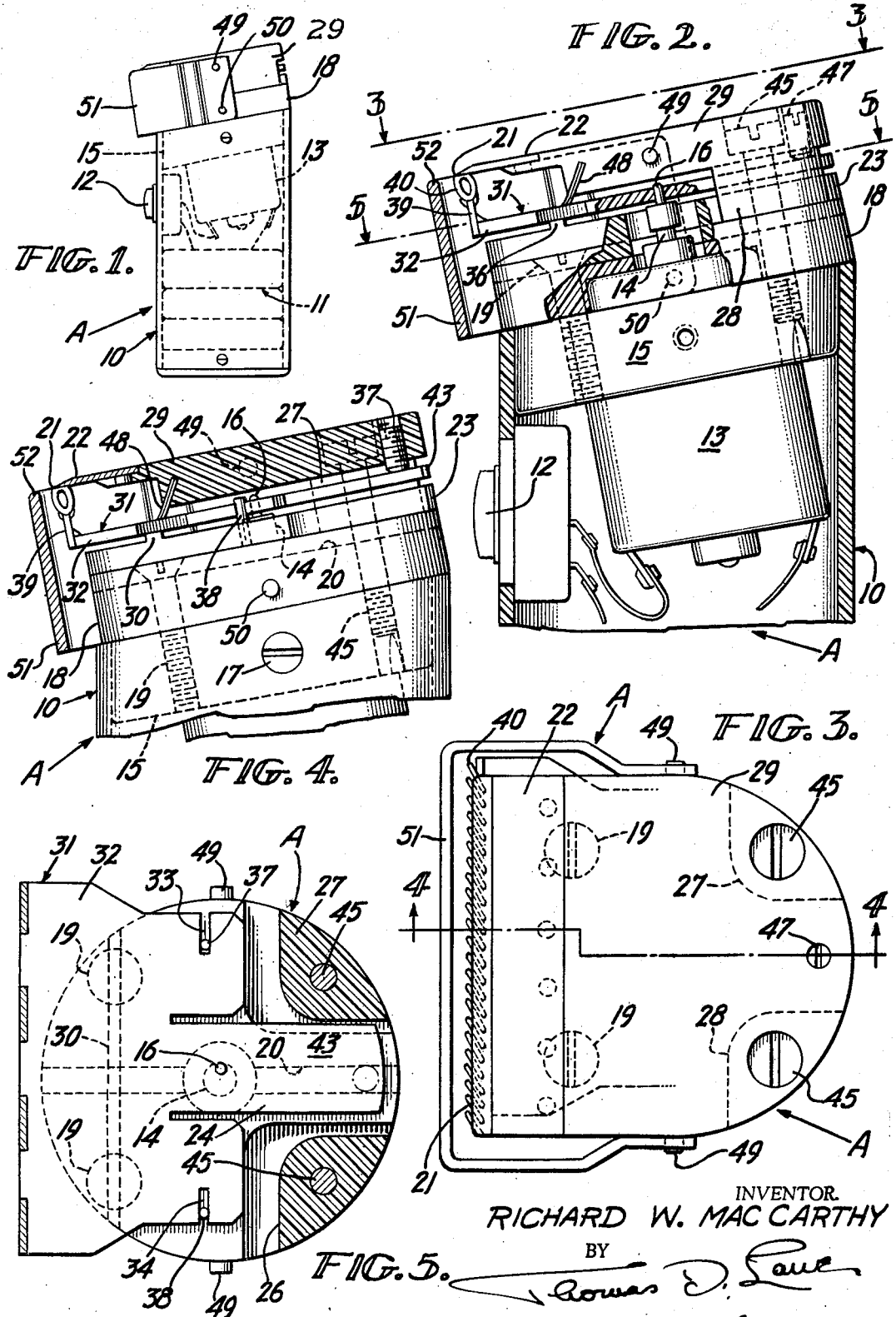

STRAIGHT EDGE RAZOR WITH RELATIVELY ORBITING BACK-UP TEETH

Filed March 4, 1968     3 Sheets-Sheet 2

INVENTOR.
RICHARD W. MAC CARTHY
BY Thomas D. Laur
ATTORNEY.

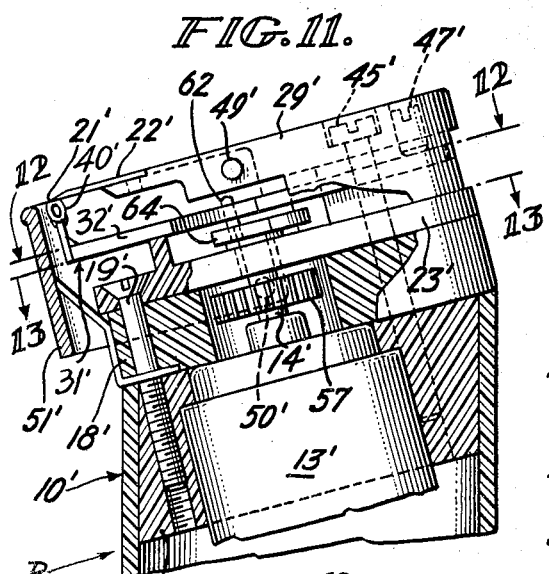
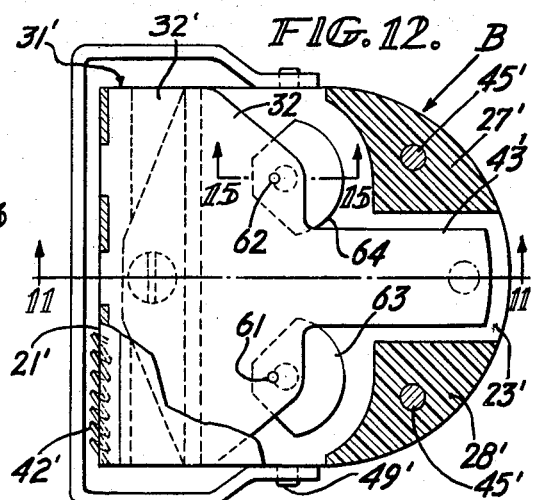
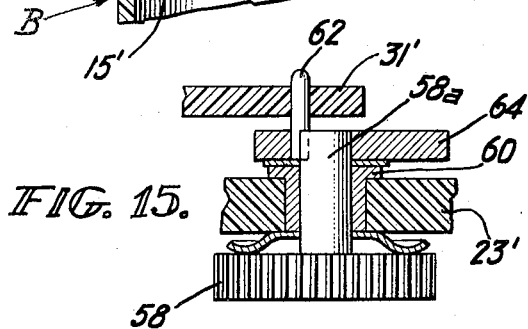
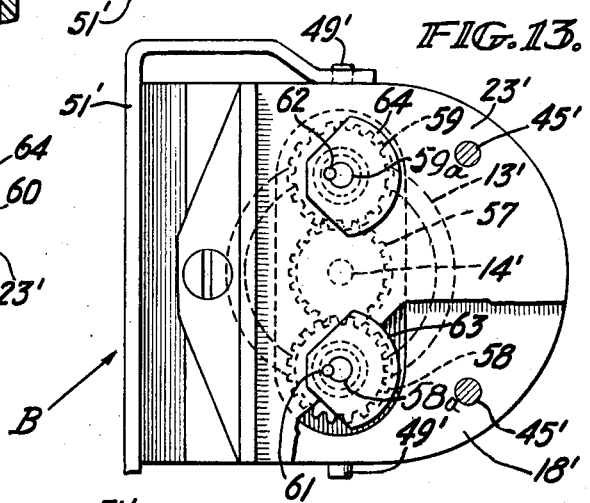
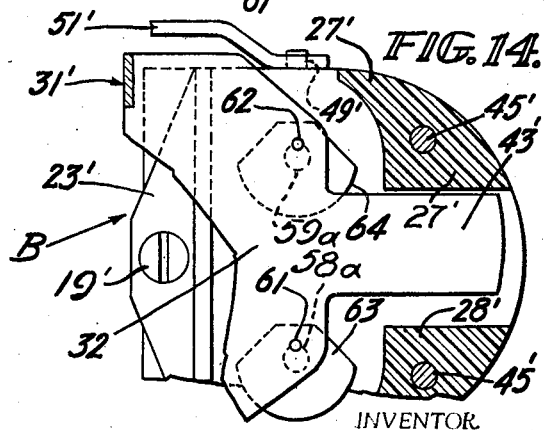

United States Patent Office 3,507,040
Patented Apr. 21, 1970

3,507,040
STRAIGHT EDGE RAZOR WITH RELATIVELY ORBITING BACK-UP TEETH
Richard W. MacCarthy, San Jose, Calif. (600 Pennsylvania Ave., Apt. 30, Los Gatos, Calif. 95030)
Filed Mar. 4, 1968, Ser. No. 710,029
Int. Cl. B26b 19/04, 19/42
U.S. Cl. 30—34.2    9 Claims

ABSTRACT OF THE DISCLOSURE

A razor having a straight edge blade and a row of blade back-up teeth mounted along the inner face of the sharpened edge of the blade, each tooth having a cutting edge thereof directed toward, and disposed at an acute angle to, the slicing, leading edge of the blade. The back-up teeth are driven to orbit relative to the blade in a manner that will cause their cutting edges to move in successive recurring cycles first outwardly beyond the edge of the blade, and then inwardly toward and across the cutting edge of the blade so as to sever whiskers caught between the teeth and the blade. A stretcher bar preferably is provided to smooth and stretch the skin in advance of the cutting edge of the blade and to assist in erecting the whiskers.

---

Referring to the drawings in detail:

FIG. 1 is a side elevational view of a razor embodying the invention, the motor and batteries being shown in broken lines.

FIG. 2 is an enlarged view of the upper portion of FIG. 1, portions being broken away.

FIG. 3 is a similarly enlarged end view looking in the direction of the arrows 3—3 of FIG. 2.

FIG. 4 is a sectional view taken along line 4—4 of FIG. 3.

FIG. 5 is a sectional view taken along line 5—5 of FIG. 2.

FIG. 11 is a sectional view of a modified form of the invention, taken along line 11—11 of FIG. 12.

FIG. 12 is a sectional view taken along line 12—12 of FIG. 11, a portion of the blade back-up teeth being shown.

FIG. 13 is a sectional view taken along line 13—13 of FIG. 11.

FIG. 14 is a sectional view, also taken along line 12—12 of FIG. 11, but showing the support plate for the blade back-up teeth in a different stage of its orbiting cycle from that shown in FIG. 12, a portion of the support plate for the back-up teeth being broken away.

FIG. 15 is an enlarged, fragmentary, sectional view taken along line 15—15 of FIG. 12.

Figure 6:
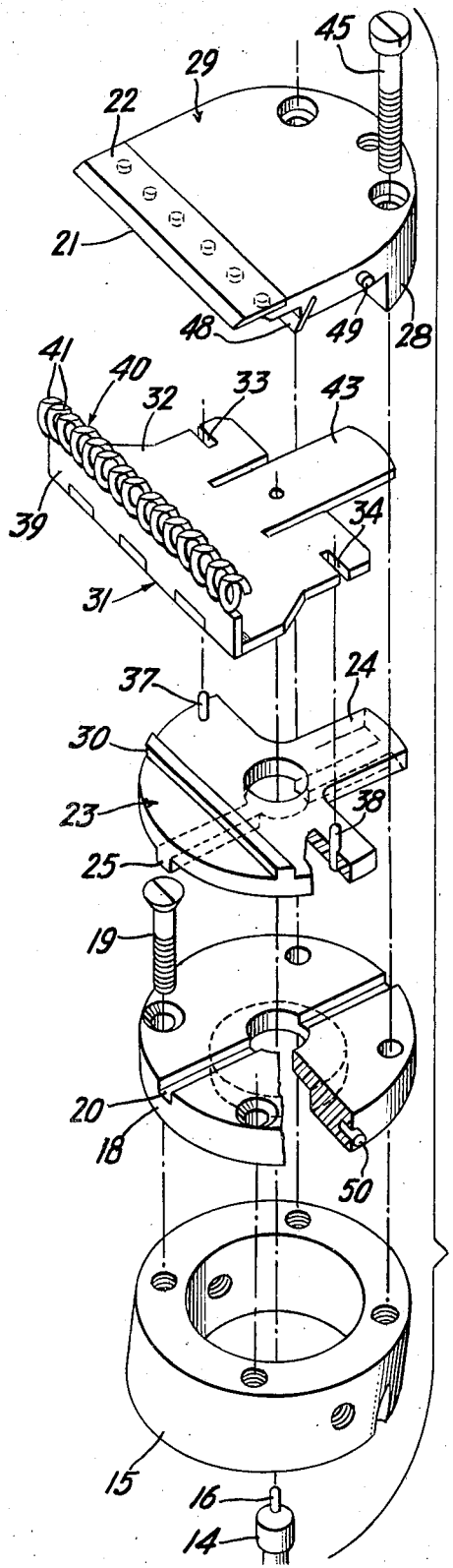
FIG. 6 is an exploded view showing the members in the head of the razor shown in FIGS. 1–5 separated axially from each other.

Referring to the drawings in detail, the terms "upper," "lower," etc., are used herein with respect to the illustrated position of the parts as shown in FIGS. 1–4, 6, 11 and 15.

Considering first the form of the invention shown in FIGS. 1–6, a razor A has a tubular body 10 with a plurality of conventional electric batteries 11 mounted therein. The terminals of the batteries are connected through conventional switch means 12 to an electric motor 13, which may be of a type commonly employed to drive electric razors. The specific motive power is not a feature of the invention, and any suitable drive means such as, for example, a spring motor may be employed if desired. The motor 13 drives a shaft 14 at a desired speed, and is mounted in a recess in a member 15 fitted into the upper end of the body 10. An eccentric pin 16 is mounted on the motor shaft 14 to project endwise therefrom with its axis parallel to that of the motor shaft. The ends of the motor mounting member 15 are parallel, and are disposed at an acute angle to the axis of the body 10, and the motor 13 is mounted with its drive shaft axis perpendicular to these ends. A set screw 17 secures the member 15 and the motor 13 in position in the housing 10.

A cylindrical or disk-like member 18 is mounted on the upper end of the motor mounting member 15, and is secured in position by a machine screw 19 which passes through a hole provided therefor in the member 18 and is screwed into a threaded hole provided therefor in the motor mounting member 15. A keyway 20 is provided in the upper face of the disk-like member 18 and extends perpendicularly to the leading, cutting edge 21 of a straight edge blade 22 to be described in detail later herein.

A plate 23 having a tongue 24 extending rearwardly therefrom is mounted for fore-and-aft sliding movement on the disk-like member 18, and a key 25 on its under side fits slidably into the keyway 20 to limit the plate to a reciprocating fore-and-aft movement. The tongue 24 rides freely between two buttresses 27 and 28 on the lower side of a blade mounting member 29.

A fulcrum ridge 30 is provided on the upper side of the sliding plate 23 at right angles to the key 25, and provides fulcrum support for a toothed member 31 during orbital movement of the toothed member by the eccentric pin 16 on the motor shaft 14.

The toothed member 31 comprises a flat plate portion 32 having a pair of guide notches 33 and 34 in opposite sides thereof to receive, respectively, a pair of guide pins 37 and 38 mounted to project from the upper side of the slidable plate 23. These guide pins, riding in their respective notches, limit movement of the toothed member 31 relative to the sliding plate 23 to a lateral reciprocating movement, but since the sliding plate 23 itself is free for fore-and-aft reciprocating movement, the toothed member 31 is thus free for movement in a circular orbit under the driving impulse of the eccentric pin 16.

An upwardly extending tooth supporting ridge 39 is provided across the forward edge of the plate portion 32 of the toothed member 31, and upon this ridge is secured a coil 40 of tool or razor-blade steel. The coil 40 is partially flattened after forming, as by running it between a pair of rollers in a well-known manner, so as to tilt the convolutions of the coil relative to its helical axis, and a flat surface 41 (FIGS. 7–10) is formed, as by grinding, on the upper side of each convolution 42. All of these surfaces 41 define a common surface which conforms to the under side of the blade 22 when assembled therewith as shown in FIGS. 1–4. Thus, the convolutions of the coil 40 comprise the teeth which co-operate with the cutting edge 21 of the blade 22 to sever whiskers caught therebetween in the same general manner as that described in my Patent No. 3,298,101, issued Jan. 17, 1967, Patent No. 3,349,483, issued Oct. 31, 1967, and pending application 642,429, filed May 31, 1967, all for circular blade razors. The flattened cutting portions of the convolutions or teeth 42 are inclined at an acute angle to the blade edge 21, a presently preferred angle being of the order of 35°. It should, of course, be understood that the teeth may be formed in a variety of different ways and means.

The toothed member 31, and the row of teeth 42 thereon are driven through successive orbital movement cycles by the eccentric pin 16, which is fitted rotatably into a hole provided therefor in the toothed member 31. The key 25 riding in its keyway 20, and the pins 37 and 38 riding in their respective notches 33 and 34 prevent rotative displacement of the toothed member 31 about the axis of the eccentric pin 16 during such orbital movements.

The toothed member 31 has an integral tongue 43 extending rearwardly therefrom, which like the tongue 24 of the sliding plate 23, rides between the buttresses 27 and 28. However, since the toothed member 31 moves in circular oscillations, instead of only forward-and-back like the sliding plate 23, the tongue 43 on the toothed member 31 is sufficiently narrow to permit such oscillative movement without striking the buttresses. FIG. 5 shows the toothed member 31 in one of its limits of lateral movement.

The blade support member 29 comprises a plate portion 44 with the two integral buttresses 27 and 28 on its under side. These buttresses rest on the disk-like member 18, and a pair of screws 45 pass through aligned holes provided therefor in the blade support member 29 and in the disk-like member 18, and are screwed into threaded holes provided therefor in the motor mounting member 15. The heads of the screws 45 are countershunk in the blade support member 29.

For adjusting the pressure of the teeth 42 against the under side of the blade 22, a pressure adjusting screw 47, having a polished, rounded lower end, which may, if desired, be a ball, has a snug, threaded fit in a threaded hole provided therefor in the blade support member 29. The rounded lower end of this screw 47 rides on the upper surface of the tongue 43 of the toothed member 31, and by turning this screw 47 in a selected direction pressure of the back-up teeth 42 against the under side of the blade 22 can be adjusted, since the toothed member 31 is fulcrumed on the fulcrum ridge 30 of the slidable plate 23.

The blade 22, having its forward edge 21 sharpened to a keen cutting edge, and preferably flat on its under side, is fixedly mounted on the forward portion of the blade support member 29 and flush with its upper face. While the blade 22 is illustrated as being permanently mounted on the blade support member 29, it is obvious that the blade 22 can be interchangeably mounted thereon in any suitable manner if desired.

A whisker guard 48, which may consist of several laminations of suitable thin, plastic sheet material, such as, for example, Teflon, is secured in a groove provided therefor in the blade support member 29, and rides on the upper surface of the toothed member 31 to prevent the entrance of whisker cuttings therebetween.

A pair of laterally projecting stretcher bar mounting pins 49 and 50 (FIGS. 1–6) are provided on each side of the members 29 and 18, respectively, to retain in position a rectangular, U-shaped stretcher bar 51 which has holes therein to fit over these pins. The stretcher bar 51 has a rounded edge 52 to engage the skin of a user just ahead of the cutting edge 21 of the blade. While the use of a stretcher bar is preferred, it is not essential, since the rapidly cycling teeth 42 tend to smooth the skin ahead of the blade during the first half of each oscillative cycle during which half cycle the teeth are projected forwardly of the cutting edge of the blade as shown in FIGS. 7 and 8, and the skin does not have time to return to a position where it could be cut by the blade during the remaining or recovery half-cycle.

In using the razor A, with the motor 13 running, the blade 22 is applied to the user's face with the supper side of the blade and its support 29 at a slight acute angle to the user's face in a manner generally similar to that employed in using a conventional safety razor. The blade 22 is then advanced across the whiskered area of the user's face in successive strokes, also in the manner of a conventional safety razor. As the blade 22 moves along the user's face, the blade back-up teeth 42 are driven in successive, oscillative cycles relative to the blade edge as shown in FIGS. 7–10.

Figure 7:
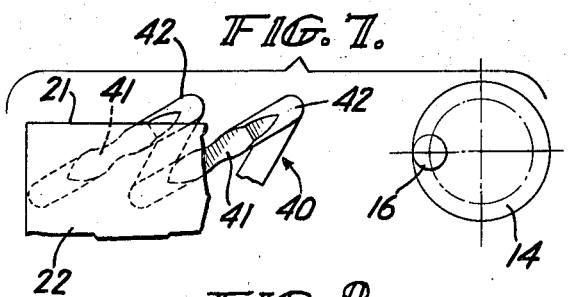
FIGS. 7–10 are further enlarged, fragmentary, diagrammatic views showing the action of the back-up teeth during successive quarter-cycles of one complete orbit of the blade back-up teeth in relation to the blade.
Figure 8:
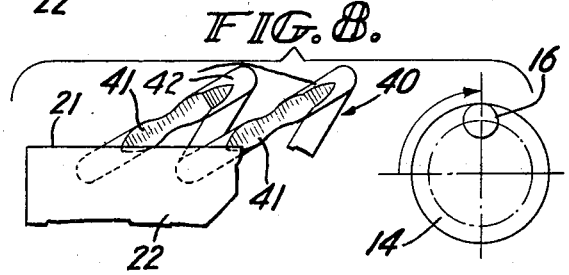
Figure 9:
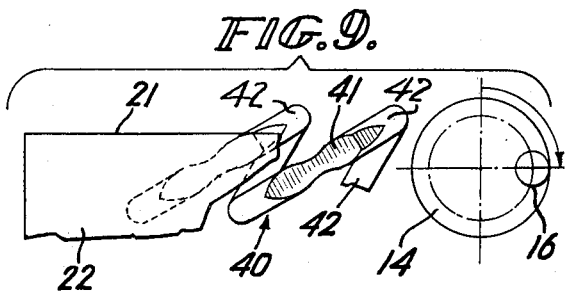
Figure 10:
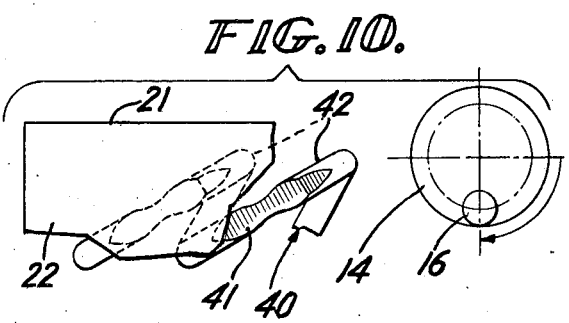

During each oscillative cycle, the teeth 40 are advanced from their position of FIG. 7, which may be considered, for the purpose of the present description, as the initial phase of the cycle, forwardly and toward the right beyond the cutting edge 21 of the blade 22 to their position of FIG. 8, in which position only the trailing ends of the teeth still contact the blade. During the next successive quarter cycle, as the teeth 42 move from their position of FIG. 8 to that of FIG. 9, the teeth 42 move generally transversely of their length and further toward the right toward and across the forward cutting edge 21 of the blade, whereby the whiskers in the zone between the teeth 42 and blade edge 21 are severed at the skin level. This is the cutting portion of the cycle, and each tooth during this cycle should sweep the portion of the blade edge between it and the next tooth toward which it is inclined so as to leave no portion of the blade edge which is not so swept. During the remaining or recovery half of the cycle of the teeth are carried across the rear face of the blade, through their position down in FIG. 10, and back to their starting position of FIG. 7, ready to begin the next successive cycle. The relative position of the eccentric pin 16 during each quarter of the oscillative cycle illustrated in FIGS. 7–10 is shown at the right of each of said figures.

In the modified form of the invention shown in FIGS. 11–15 a razor B is provided which is generally similar to that shown in FIGS. 1–6, the principal difference being in the mechanism for oscillating the blade back-up teeth. Since the major parts of the razor B shown in FIGS. 11–15 are quite similar, both in structure and function to those of the razor A illustrated and described in FIGS. 1–6, the same reference numerals will be used for corresponding parts of the razor B of FIGS. 11–15 with the prime (') added thereto.

The motor shaft 14' of the razor B shown in FIGS. 11–15 has a drive gear 57 secured coaxially thereon, and this gear drives a pair of similar side gears 58 and 59, the shafts 58a and 59a of which are journaled in bushings 60 (FIG. 15) in the plate 23'. The latter plate 23' unlike its counterpart, the sliding plate 23 of FIGS. 2–5, is secured in position by the screw 19'. A pair of eccentric pins 61 and 62 are mounted in notches provided therefor in the side gear shafts 58a and 59a, respectively, and are secured in position in their respective notches by counterweights 63 and 64, one of which is fitted with a press fit onto each side gear shaft and its respectively eccentric pin.

The eccentric pins 61 and 62 extend upwardly, and fit rotatively into a pair of holes provided therefor in the plate portion 32' of the toothed member 31', which rides on the fulcrum ridge 30' on the plate 23'. The back-up teeth 42' are pressure-adjusted against the under side of the blade 22' by the screw 47'.

The side gears 58 and 59 are driven to rotate in the same direction by the central gear 57, mounted on the motor shaft 14', and the eccentric pins 61 and 62 oscillate the toothed member 31' in recurring cycles in the same general manner as in the razor A shown in FIGS. 1–6, and described previously herein.

The razor B of FIGS. 11–15 operates, and is used, in the same manner as the razor A shown in FIGS. 1–6.

While the materials employed for the various parts will be subject to selection by individual designers, the following materials have been found satisfactory for the major parts of the razor A of FIGS. 1–6. For the blade support, acetol resin or "Delrin"; for the plate portion of the toothed member, nylon; for the coil supporting ridge, nylon; for bonding the coil to its supporting ridge, epoxy cement; for the stretcher bar, spring brass; for the sliding plate, "Delrin"; for the disk-line member which supports the sliding plate, nylon; and for the housing, phenolic resin tubing.

The present invention provides a simple, inexpensive, extremely effective and reliable razor, and since the cutting edge 21 of the blade is in direct contact with the user's skin, it provides a shave that is as close as any that can be attained with a straight edge razor, whether safety or otherwise. This is in distinct contrast to the ordinary electric razor, which employs two sets of relatively superposed and oscillating teeth. Regardless of how thin the under teeth of such a razor are made, they cannot cut the whiskers any closer to the skin than the thickness of the under set of teeth. Also, of course, the thinner such under teeth are made, the more fragile they become.

The present invention makes it very easy to change blades in the event the cutting edge 21 of the blade 22 should become nicked or otherwise damaged. However, it is usually unnecessary to sharpen or replace the blade 22 unless it is actually damaged, since the action of the backup teeth against the under side of the blade tend to sharpen the latter during use.

While I have illustrated and described a preferred embodiment of the present invention, it will be understood, however, that various changes and modifications may be made in the details thereof without departing from the scope of the invention as set forth in the appended claims.

I claim:

1. A razor comprising a body portion and a head portion,
   a blade mounted on the head portion and having a straight, leading edge thereof sharpened to a keen cutting edge,
   a row of back-up teeth mounted in sliding contact with the inner side of the blade and aligned with the cutting edge thereof, each tooth having a cutting edge directed toward, and at an actuate angle to, the cutting edge of the blade, and
   drive means mounted to oscillate the back-up teeth through successive cycles wherein during a portion of each cycle the teeth are advanced forwardly of the cutting edge of the blade, and thence during a succeeding portion of each cycle are moved toward the cutting edge of the blade, whereby whiskers trapped between the cutting edges of the teeth and the cutting edge of the blade are severed therebetween.

2. A razor as claimed in claim 1 wherein during each said succeeding portion of each cycle the teeth are moved in a direction generally transversely to their respective cutting edges.

3. A razor as claimed in claim 1 wherein the cutting edges of the teeth are inclined at an angle of the order of 35° to the cutting edge of the blade.

4. A razor as claimed in claim 1 wherein the portions of the blade swept by adjacent teeth during a complete cycle of the teeth overlap.

5. A razor as claimed in claim 1 wherein a stretcher bar is mounted on the razor and is positioned to ride along the skin of a user ahead of the cutting edge of the blade during a shaving stroke with the razor.

6. A razor as claimed in claim 1 wherein the drive means comprises a drive motor mounted on the razor and in driving relation with an eccentric member, which in turn has driving connection with the teeth to orbit the teeth through their successive cycles, means being provided to retain the teeth from rotative displacement about the eccentric member as an axis.

7. A razor as claimed in claim 6 wherein the means provided to retain the teeth from rotative displacement comprises a sliding plate mounted for reciprocating movement back-and-forth in a lineal direction, and the teeth are mounted for reciprocating movement in a lineal direction relative to the sliding plate at right angles to the direction of lineal reciprocation of the sliding plate.

8. A razor as claimed in claim 6 wherein the means provided to retain the teeth from rotative displacement comprises a pair of eccentric members, mounted to orbit synchronously around parallel axes, of equal eccentricity, and spaced apart transversely to their axes, both of said eccentric members being in continuous driving engagement with the row of back-up teeth.

9. A razor as claimed in claim 1 wherein the teeth comprise a plurality of convolutions of a helical coil of tool steel wire, each convolution of the coil having a surface formed on a radially outward side thereof, all of said surfaces defining a common surface which conforms to the inner side of the blade.

References Cited

UNITED STATES PATENTS

| 2,263,747 | 11/1941 | Stein | 30—43.3 |
| 2,858,607 | 11/1958 | Kane | 30—43.6 |

FOREIGN PATENTS 894,212   3/1944   France.

OTHELL M. SIMPSON, Primary Examiner

G. F. GRAFEL, Assistant Examiner

U.S. Cl. X.R.

30—43.7, 43.91